(12) United States Patent
Kluge et al.

(10) Patent No.: US 10,845,215 B2
(45) Date of Patent: Nov. 24, 2020

(54) INDUCTIVE POSITION SENSOR

(71) Applicant: Melexis Technologies SA, Bevaix (CH)

(72) Inventors: Wolfram Kluge, Dresden (DE);
Lorenzo Lugani, Morges (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 82 days.

(21) Appl. No.: 16/253,711

(22) Filed: Jan. 22, 2019

(65) Prior Publication Data
US 2019/0226877 A1   Jul. 25, 2019

(30) Foreign Application Priority Data

Jan. 22, 2018 (EP) ..................................... 18152820
Jan. 22, 2018 (EP) ..................................... 18152822
Jan. 22, 2018 (EP) ..................................... 18152825
Jan. 22, 2018 (EP) ..................................... 18152828

(51) Int. Cl.
*G01D 5/20* (2006.01)
*G01B 7/00* (2006.01)
*G01B 7/31* (2006.01)

(52) U.S. Cl.
CPC ........... *G01D 5/2053* (2013.01); *G01B 7/003* (2013.01); *G01B 7/31* (2013.01); *G01D 5/2006* (2013.01)

(58) Field of Classification Search
CPC .... G01D 5/2053; G01D 5/2006; G01B 7/003; G01B 7/31
USPC .............. 324/207.15–207.17, 207.23–207.26
See application file for complete search history.

(56) References Cited

U.S. PATENT DOCUMENTS

| | | | | |
|---|---|---|---|---|
| 4,255,711 A | * | 3/1981 | Thompson | G01V 3/107 324/329 |
| 4,893,077 A | * | 1/1990 | Auchterlonie | G01B 7/14 318/656 |
| 4,996,481 A | * | 2/1991 | Ackerman | G01R 33/341 324/318 |
| 5,003,260 A | * | 3/1991 | Auchterlonie | G01B 7/14 324/207.16 |

(Continued)

FOREIGN PATENT DOCUMENTS

| | | | | |
|---|---|---|---|---|
| DE | 202008013715 U1 | | 1/2009 | |
| DE | 102016202877 B3 | * | 6/2017 | ........... G01D 5/2053 |

(Continued)

OTHER PUBLICATIONS

European Search Report from EP Application No. 18152822.5, dated Mar. 9, 2018.

(Continued)

*Primary Examiner* — Patrick Assouad
*Assistant Examiner* — Sean Curtis
(74) *Attorney, Agent, or Firm* — Workman Nydegger

(57) ABSTRACT

The present invention relates to an inductive position sensor configured to determine a position of a target device, comprising at least one receiving coil arranged to receive a magnetic field and an inner transmitting coil winding and an outer transmitting coil winding arranged to generate said magnetic field, whereby said at least one receiving coil is positioned between said inner transmitting coil winding and said outer transmitting coil winding and whereby said inner transmitting coil winding and said outer transmitting coil winding are so arranged that current flows in the same sense.

14 Claims, 3 Drawing Sheets

(56) References Cited

U.S. PATENT DOCUMENTS

| | | | | |
|---|---|---|---|---|
| 5,041,791 | A * | 8/1991 | Ackerman | G01R 33/341 324/318 |
| 5,804,963 | A * | 9/1998 | Meyer | G01D 5/202 324/207.17 |
| 6,011,389 | A * | 1/2000 | Masreliez | G01D 5/2046 324/207.17 |
| 6,040,697 | A * | 3/2000 | Misic | G01R 33/3415 324/318 |
| 6,107,794 | A * | 8/2000 | Kipp | F04D 15/0088 324/207.16 |
| 6,111,402 | A * | 8/2000 | Fischer | G01D 5/2053 324/207.17 |
| 6,255,810 | B1 * | 7/2001 | Irle | G01B 7/30 324/207.17 |
| 6,259,249 | B1 * | 7/2001 | Miyata | G01B 7/003 324/207.12 |
| 6,304,076 | B1 * | 10/2001 | Madni | G01D 5/2053 318/660 |
| 6,396,273 | B2 | 5/2002 | Misic | G01R 33/3415 324/318 |
| 6,534,970 | B1 * | 3/2003 | Ely | G01D 5/2073 324/207.17 |
| 6,642,710 | B2 * | 11/2003 | Morrison | G01B 7/003 324/207.12 |
| 6,714,013 | B2 * | 3/2004 | Misic | G01R 33/3415 324/318 |
| 7,012,430 | B2 * | 3/2006 | Misic | G01R 33/3415 324/318 |
| 7,463,020 | B2 * | 12/2008 | Kuhn | H03K 17/9505 324/207.11 |
| 8,421,446 | B2 * | 4/2013 | Straubinger | G01D 5/2225 324/207.15 |
| 8,878,523 | B2 * | 11/2014 | Kobayashi | G01D 5/208 324/207.17 |
| 2002/0089326 | A1 * | 7/2002 | Morrison | F15B 15/2861 324/207.12 |
| 2003/0067293 | A1 * | 4/2003 | Golder | G01V 3/15 324/67 |
| 2003/0136604 | A1 | 7/2003 | Yamanaka et al. | |
| 2003/0151402 | A1 | 8/2003 | Kindler | |
| 2006/0219436 | A1 | 10/2006 | Taylor et al. | |
| 2007/0005133 | A1 | 1/2007 | Lashinski et al. | |
| 2008/0204118 | A1 * | 8/2008 | Kuhn | H03K 17/9525 327/517 |
| 2011/0046906 | A1 | 2/2011 | Albertini | |
| 2011/0181302 | A1 * | 7/2011 | Shao | G01D 5/2225 324/654 |
| 2012/0161759 | A1 * | 6/2012 | Pozzati | G01R 33/093 324/252 |
| 2013/0069637 | A1 * | 3/2013 | Kobayashi | G01D 5/208 324/207.17 |
| 2014/0203800 | A1 * | 7/2014 | Sasaki | G01B 7/30 324/207.16 |
| 2014/0217533 | A1 * | 8/2014 | Pagani | G01R 33/0047 257/427 |
| 2014/0247042 | A1 | 9/2014 | Lei et al. | |
| 2014/0298785 | A1 * | 10/2014 | Muller | B60T 17/221 60/327 |
| 2016/0313142 | A1 * | 10/2016 | Muehlfeld | G01D 5/20 |
| 2017/0175259 | A1 | 6/2017 | Lee et al. | |
| 2018/0313665 | A1 * | 11/2018 | Goto | G01L 5/00 |
| 2019/0017845 | A1 | 1/2019 | Utermoehlen et al. | |
| 2019/0226828 | A1 * | 7/2019 | Lugani | G01B 7/003 |
| 2019/0226877 | A1 * | 7/2019 | Kluge | G01D 5/2053 |
| 2019/0331541 | A1 * | 10/2019 | Janisch | B62D 1/046 |
| 2020/0064158 | A1 * | 2/2020 | Lee | H01F 38/14 |
| 2020/0149927 | A1 * | 5/2020 | Zhang | G01D 5/2086 |

FOREIGN PATENT DOCUMENTS

| | | | | |
|---|---|---|---|---|
| DE | 102016202877 B3 | 6/2017 | | |
| EP | 1746430 A1 | 1/2007 | | |
| EP | 3514502 A1 * | 7/2019 | | G01B 7/003 |
| WO | WO-2018108783 A2 * | 6/2018 | | G01L 3/105 |

OTHER PUBLICATIONS

European Search Report from EP Application No. 18152828.2, dated Jul. 25, 2018.
European Search Report from EP Application No. 18152820.9, dated Apr. 25, 2018.
European Search Report from EP Application No. 18152825.8, dated Jun. 20, 2018.
Extended European Search Report from EP Application No. 19152812.4, dated Jun. 11, 2019.

* cited by examiner

INDUCTIVE POSITION SENSOR

FIELD OF THE INVENTION

The present invention is generally related to the field of devices for sensing a position of a target, whereby said devices use magnetic induction.

BACKGROUND OF THE INVENTION

Apparatuses for measuring a magnetic field property of a magnetic field are often referred to as magnetic field sensors or magnetic sensors. These kinds of sensors have a broad field of use. Often, these kinds of sensors are used in combination with magnetized objects or objects which influence a magnetic field in one way or another. Thereby, the magnetic sensors measure at least one property of the magnetic field either emanated by the object, i.e. originating from the object itself, or influenced by the object. Based on the measured at least one magnetic field property the position of the object is determined, thereby more than at least one measured magnetic field property may be combined or processed to determine the position of the object. Therefore, these sensors are also often called position sensors. The most common position sensors are thereby linear and angular position sensors. A linear position sensor determines the position of the object on a linear path relative to the sensor whereas an angular sensor determines the angular orientation of such an object in the vicinity of the sensor. Furthermore, the sensors are also capable of determining a change in the position of the object, for example a motion of the object on a linear path or its rotation.

The position sensors can perform either direct or indirect measurements of the at least one property of the encountered magnetic field to determine the linear and/or angular position of the object. The measured property of the magnetic field allows quantifying the magnetic field, for example in terms of the magnetic field strength, its direction or the magnetic flux etc. and as such allows a determination of the position of the object, which either emanates the magnetic field or affects the magnetic field. For a direct measurement, for example, the magnetic field strength of the magnetic field encountered can be measured, whereas for an indirect measurement the magnetic flux can be measured by measuring a quantifiable property induced by the magnetic flux, for example an induced current or voltage.

Position sensors using direct measurements often employ Hall elements, in order to measure the magnetic field strength of the encountered magnetic field and then determine the angular and/or linear position of the object based on the measured magnetic field strength.

Position sensors using indirect measurements often employ inductive sensor elements, for example coils, in order to measure a property induced by the encountered magnetic field and then determine based on the measured induced property the angular and/or linear position of the object, which in this context is also often referred to as a target. Inductive sensors rely on the physical effect of electromagnetic induction, wherein an electric field is generated in a coil by changes in a magnetic flux density. This arrangement enables the formation of a no-contact sensor, whereby a maintenance-free sensor can be produced. The magnetic field which induces the measured property can thereby either originate from the target, for example by eddy currents induced in the target itself, or can originate from a coil generating a magnetic field, which then couples via the target to at least one receiving coil.

Inductive magnetic sensors are not affected by static disturbing magnetic fields (static stray fields) from surrounding components, devices, apparatuses or the environment in general. Nevertheless, these inductive magnetic sensors are still sensitive to alternating disturbing magnetic fields (alternating stray fields).

Furthermore, since the inductive magnetic sensors must be capable of being integrated in a small packaging, only a limited area can be used for the sensor elements generating the magnetic field and respectively receiving the magnetic field. While the size of the sensor elements shrink, the tolerances of the target position remain unchanged, i.e. their acceptable displacements relative to the sensor remain unchanged. This means amongst other things the targets can still have a substantial offset as compared to the size of the area used for the sensor elements. An offset in this context refers to any displacement of the target in relation to the inductive magnetic sensors, which leads to a wrong determination of the position of the target. Thereby, a displacement can refer either to a lateral offset of the target and the inductive magnetic sensor, or to an angular offset of the target and the inductive magnetic sensor. In the known inductive magnetic sensors, for example, the target and the sensor elements must be aligned either to a rotational axis or to a linear path, at least to a certain degree, in order to allow the position to be determined correctly. An offset from the rotational axis or the linear path leads to incorrect position determinations. As such, it can be said that known inductive magnetic sensors are not offset invariant. Hence, they are not robust to target offsets, since even a small offset of the target from the expected rotational axis or the expected linear path lead to wrong magnetic field measurements and in turn to wrong position determinations. This means, if the target's axis of rotation or path of movement is offset either due to mechanical tolerances or mechanical wear, the target position cannot be determined accurately, i.e. the determined position of the target deviates from the real position of the target. These target offsets require as such complex correction algorithms or correcting means, if such corrections are even possible. In any case, such corrections are limited to target offsets, which are small with respect to the dimensions of the sensor.

Moreover, the need to keep airgaps between sensor and target to values in the same order of magnitude as the ones encountered in macroscopic sensors brings as a consequence a low signal strength. Therefore, the direct coupling between a transmit and a receive coil, which constitutes a received signal bringing no information (hereafter referred to as common mode), has to be minimized as much as possible and brought to levels at most similar to the useful signal level.

Hence, there is a need to overcome the disadvantages of the known prior art solutions and to provide an improved position sensor that reduces the influences of magnetic stray fields, that is invariant to target offsets and that reduces the common mode signal, i.e. enhance the useable signal, and reduce the need for highly translational invariant targets.

SUMMARY OF THE INVENTION

It is an object of embodiments of the present invention to provide for an inductive position sensor so designed that the useful signal is enhanced and the common mode signal reduced. It is also an object to provide for a system comprising such an inductive position sensor and a target device, of which the position is to be determined.

The above objective is accomplished by the solution according to the present invention.

An apparatus according to the invention may also be referred to as a sensor, a position sensor, a magnetic sensor, a magnetic position sensor, an inductive sensor or an inductive position sensor.

In a first aspect the invention relates to an inductive position sensor configured to determine a position of a target device, comprising at least one receiving coil arranged to receive a magnetic field and an inner transmitting coil winding and an outer transmitting coil winding arranged to generate said magnetic field, whereby the at least one receiving coil is positioned between the inner transmitting coil winding and the outer transmitting coil winding and whereby the inner transmitting coil winding and the outer transmitting coil winding are so arranged that current flows in the same sense in the inner transmitting coil winding and the outer transmitting coil winding.

The proposed solution indeed allows for suppressing the direct coupling between the transmit and receive coils, due to the specific design of the two transmit coil windings directed towards achieving a zero net magnetic flux in the at least one receiving coil in the absence of a target device. The inner and outer transmit windings are so that the current flows in the same sense, while the one or more receiving coils are placed in the space between the transmit coil windings.

The sensor according to the invention is for sensing a position of a target device relative to the sensor. This position determination is based on measuring at least one magnetic field property of a magnetic field affected by the target, wherein this affected magnetic field is emanated by the sensor. Thereby, it can be said that the sensor emanates a first magnetic field and receives a second magnetic field. The second magnetic field is thereby the emanated first magnetic field affected by the target. It can also be said that the first and second magnetic field are associated. Thereby, the target may have a shape or form, which affects the first magnetic field in one preferred direction, which is substantially the same for the entire target, and the shape or form may be non-rotationally invariant. Hence, if the first magnetic field emanated from the sensor is known, for example being rotationally symmetrical, and the target's shape or form has a predefined direction in which it affects this known first magnetic field, the position of the target can be determined based on a measurement of a magnetic field property of the affected magnetic field, hence the second magnetic field, which includes the information of how the first magnetic field was affected. Hence, by measuring the second magnetic field, this information can be extracted and as such the position of the target can be determined. The effect the target's shape or form has got on the emanated first magnetic field is thereby also substantially uniform over the area of the target which faces the sensor. The target device may be larger than the area used for the sensor elements generating the first magnetic field and receiving the second magnetic field. The first magnetic field emanated from the sensor may therefore only impinge on a fraction of the area of the target. Since the effect the target's shape or form has got on the emanated first magnetic field is substantially uniform over the area of the target, an offset of the position determination is offset invariant. The position determination may thereby be an angular position and/or a linear position determination. The target device may be a moveable object, which rotates or moves in a plane, wherein this plane is spatially separated from a plane defined by one or more elements of the sensor which either emanate the first magnetic field or receive the second magnetic field, respectively measure a magnetic field property of the second magnetic field. The target device may move relatively to the sensor, whereby the sensor may have a fixed position. It is however also possible that the target may have a fixed position and the sensor moves relatively to the target. It is also possible that both, the sensor as well as the target, move relatively to one another. Thereby, the sensor and/or the target may be mounted to/on moveable parts, for example, moveable parts of a vehicle.

In a preferred embodiment the inner transmitting coil winding and the outer transmitting coil winding form a single coil.

Preferably the inner transmitting coil winding and the outer transmitting coil winding are arranged to generate an alternating magnetic flux inducing a signal at the at least one receiving coil, whereby in absence of external disturbances the signal is substantially zero.

In a preferred embodiment there is an even number of receiving coils in the inductive position sensor. In other preferred embodiments there is an odd number of receiving coils, for example three receiving coils.

In certain embodiments the at least one receiving coil and the transmitting coil winding and the outer transmitting coil winding are in a same plane or in a same set of planes.

In embodiments the at least one receiving coil does not overlap with the inner transmitting coil winding and the outer transmitting coil winding fully overlaps with the at least one receiving coil.

In another embodiment the inner transmitting coil winding and the outer transmitting coil winding have a same central point.

In a preferred embodiment the inductive position sensor comprises at least two receiving coils. The at least two receiving coils are in certain embodiments arranged to form a circle around the inner transmitting coil winding. In one embodiment the at least two receiving coils are arranged equi-angularly in the circle.

In embodiments of the invention at least two of the at least two receiving coils have a same inductance.

Advantageously, the at least two receiving coils cover at least 50% or at least 60% or at least 70% or at least 80% or at least 90% of the area between the inner transmitting coil winding and the outer transmitting coil winding.

In another aspect the invention relates to a system comprising an inductive position sensor as in previously described and a target device arranged to rotate around a centre of geometry of the inductive position sensor.

In one embodiment the system further comprises a determination unit arranged to process signals received from the at least one receiving coil and/or the inner transmitting coil winding and the outer transmitting coil winding.

In one embodiment the transmit coil windings and/or receive coil are inside the package comprising the inductive position sensor. In other embodiments the transmit coil windings and/or receive coil are outside that package.

In embodiments wherein there are at least two receiving coils, there are at least three sensor elements which form the sensor. As already mentioned, the inner transmitting coil and the outer transmitting coil may in preferred embodiments together form the transmitting sensor element. It shall be understood by a person skilled in the art that even though only three sensor elements are named here, any number of sensor elements equal or greater than three may be implemented. Note that in other embodiments there may be only one transmit coil (comprising the inner and the outer winding) and only one receiving coil, hence only two sensor elements in total.

At least one of the sensor elements of the sensor according to the invention is configured to generate a first magnetic field. It can also be said that the respective at least one sensor element emanates the first magnetic field. This at least one sensor element may therefore also be referred to as a generating sensor element or a transmitting sensor element. The emanated first magnetic field is thereby a vector field, denoted B, which may comprise the three components Bx, By and B, in a threedimensional Cartesian coordinate system. However, a person skilled in the art will recognize that also other components may be possible, which are only dependent on the definition of the used coordinate system. The at least one transmitting sensor element may generate the first magnetic field as a response to an electric current, which may be applied to the transmitting sensor element. The electric current causes a movement of electromagnetic charges. As known in the art, a movement of electromagnetic charges generates a magnetic field. The generated first magnetic field may have a known form, for example, the generated first magnetic field may be a symmetric magnetic field, i.e. rotationally invariant magnetic field.

Further, assuming an embodiment with at least three sensor elements, at least two of the sensor elements are configured to receive a second magnetic field, respectively measure a property of a second magnetic field they encounter. This second magnetic field is the first magnetic field affected by the target device. As such, the second magnetic field conveys the information how it was affected by the target. The at least two sensor elements, which receive the second magnetic field may also be referred to as receiving sensor elements. It can also be said that the magnetic field lines, which are emanated from the at least one transmitting sensor element couple via the target to the at least two receiving sensor elements. Hence, it can also be said that the magnetic flux emanated by the at least one transmitting sensor element is coupled to the at least two receiving sensor elements via the target. Thereby, the magnetic flux is a measurement of the total magnetic field which passes through a given surface. Hence, the magnetic flux is related to the number of magnetic field lines of the magnetic field, which pass through the given surface, i.e. to the density of the magnetic field lines. The magnetic flux coupling causes the receiving sensor elements to output each a current or a voltage, wherein the magnitude of the outputted current or voltage is dependent on the encountered magnetic flux. It can also be said that the respective sensor elements output a signal, which is associated with the received second magnetic field. Thereby, the encountered currents or voltages give a direct indication of how the target has affected the first magnetic field emanated from the at least one transmitting sensor element. For example, the encountered currents or voltages give an indication how the emanated first magnetic field was deformed, i.e. how the course of the first magnetic field lines of the emanated first magnetic field was altered, by the target. In turn, the encountered currents or voltages give an indication how much of the originally emanated first magnetic flux is received by the at least two receiving sensor elements. Since the currents or voltages are dependent on the magnetic flux encountered by the at least two receiving sensor elements they give an indication of the position of the target. Furthermore, a change in the currents or voltages can be used to determine a change in the position of the target, since also the emanated first magnetic field is affected differently when the position of the target changes. This in turn means the magnetic flux encountered by the at least two receiving sensor elements changes. The position determination may be outputted by the sensor as a signal.

Thereby, the at least two receiving sensor elements form at least one sensor element pair. Hence, the current or voltage values outputted by the at least two sensor elements are then combined to provide a signal indicative of the position of the target. For example, the outputted values may be subtracted, whereby one value of one receiving sensor element represents the minuend and the other value of the other receiving sensor element represents the subtrahend of the subtraction. It can also be said that the sensor elements are operated in a differential manner or differential mode, since a difference is formed. By performing such a differential measurement, an influence which acts upon both receiving sensor elements substantially alike is cancelled. For example, a stray field, which carries a magnetic flux, which influences both receiving sensor elements alike is cancelled due to the subtraction. The outputted values may however also be summed, whereby one value of the of one receiving sensor element represents one addend and the other value of the other receiving sensor element represents the other addend of the summation. It can also be said that the at least two sensor elements are operated in a common manner or common mode, since a summation is formed. It is clear to a person skilled in the art that it can be switched between the operational modes and that in one time instance the difference of the output values of at least two sensor elements can be formed, whereas in another time instance the sum can be formed. Therefore, the apparatus according to the invention for the first time allows determining a position of a target with a sensor, wherein the position sensing is invariant with respect to a stray field.

The coupling between the at least one transmitting sensor element and the at least two receiving sensor elements may be affected, i.e. influenced, by the target and in particular the shape or form of the target. The shape or form of the target may influence the magnetic field lines emanated from the at least one transmitting sensor element to align in a preferred direction. Hence, if the target is moved and at least one receiving sensor element lies within this preferred direction, the magnetic flux coupling between the at least one transmitting sensor element and the respective at least one receiving sensor element is the highest, whereas the other of the at least two receiving elements may not lie within the preferred direction and may encounter a weaker magnetic flux coupling, such that the at least two receiving elements will generate different currents or voltages. This situation changes again when the target is moved and as such the emanated first magnetic field is again affected differently. Based on the amount of measured property, for example induced voltage or current, at each one of the at least two receiving sensor elements, the position of the target can be determined, because the amount of the property measured at each of the at least two receiving sensor elements gives a measure of the magnetic flux coupling. If the property is high, the magnetic flux coupling is high, which in turn means the preferred direction of the target is aligned with a connecting line of the at least one transmitting sensor element and the respective one of the at least two receiving sensor elements. If the amount of the property is low, the magnetic flux coupling is low, which in turn means the preferred direction of the target is not aligned with a connecting line of the at least one transmitting sensor element and the respective one of the at least two receiving sensor elements. Besides only affecting the emanated first magnetic field, by influencing the direction or the orientation of the magnetic field lines, it may also be possible for the target to concentrate the magnetic field lines at a particular region, for example at the location of one of the receiving sensor elements. Further, it may also be possible for the target to push the magnetic field lines aside from a particular region. Thereby, it may be possible to reduce the number or the density of the magnetic field lines in the location of at least one of the receiving sensor elements.

The shape or form of the target may affect the coupling of the magnetic flux of the emanated magnetic field in an offset invariant manner. Thereby, offset invariant manner refers to the fact that the target has a shape or form, which affects the magnetic flux coupling between the at least one transmitting sensor element and the at least two receiving sensor elements in a way that a target offset has only minimal to no effect on the current or voltage outputted by the at least two receiving elements. Thereby, the target may have a non-rotationally invariant shape or form. For example, if the target is used for angular position determination, the shape or form of the target may be non-rotationally invariant with respect to a rotation of the target relatively to the at least three sensor elements. If the target shall be used for linear position determination, the shape or form of the target may change with respect to a direction of an expected linear change of the position of the target relatively to the at least three sensor elements. In any of these cases, non-rotationally invariant means that the shape or form of the target as seen from a location of the sensor elements, in particular from at least one specific sensor element, may not be the same when the target is rotated about an axis in an arbitrary angle. Hence, it may also be said that the shape or form of the target is anisotropic. An anisotropic target device is characterized in that the shape or form of the target is different if it is viewed from different directions. This means the shape or form of the target affects the course of the magnetic field lines of the emanated first magnetic field differently for different positions of the target. Hence, the shape or form of the target may cause the magnetic field lines of the emanated magnetic field to align with this preferred direction. This alignment is not changed if the target is offset, because an offset caused for example by a displacement of the target may not change how the shape or form of the target influences the course of the magnetic field lines of the emanated first magnetic field. In other words, the target facing the sensor may define a target plane and the shape or form of the target within this target plane may be translational invariant on at least one axis comprised in the target plane. This in turn means that even though the target is offset, the relative magnetic flux coupling between the at least one transmitting sensor element and the at least two receiving sensor elements, remains substantially the same, even when the target is offset. The information of how the target affects the first magnetic field, is part of the received second magnetic field. Hence, by measuring the second magnetic field and cancelling stray field parts from the second magnetic field, the position of the target can be determined.

In one preferred embodiment of the invention, the number of sensor elements generating the first magnetic field is lower than the number of sensor elements receiving the second magnetic field. For example, only one sensor element may generate the magnetic field, whereas a higher number of sensor elements may receive the second magnetic field. Thereby, the different receiving sensor elements may form sensor element pairs, i.e. one signal is outputted by two receiving sensor elements. All of the receiving sensor element pairs may thereby output a signal at the same time, such that based on the knowledge of the position of the receiving sensor element pairs to one another and the known preferred direction of the target, the effect the target has got on the first magnetic field can be measured from different locations. This has the advantage that the position can be accurately determined, by combining several measurements. This position determination is preferably performed when the target rapidly changes its position, because then for every instant in time several measurements from several locations are taken. If the target is not moving rapidly, it is possible to combine output signals of different receiving sensor elements in a successive manner and not all at once.

In one preferred embodiment of the invention the number of sensor elements generating the first magnetic field may be higher than the number of sensor elements receiving the second magnetic field. For example, at a given time only one sensor element pair is measuring the second magnetic field and the remaining sensor elements contribute to generating the first magnetic field. In this case the first magnetic field is a superposition off all the magnetic fields generated by the respective sensor elements. In order to also in this case achieve several measurements of the second magnetic field, the operational mode of the sensor elements may be changed, i.e. at one point in time at least two sensor elements receive the magnetic field, whereas the other sensor elements generate the first magnetic field. In another point in time, the same sensor elements which before were the receiving sensor elements also generate the first magnetic field, whereas at least two of the other sensor elements, which before were generating the first magnetic field now receive the second magnetic field. This operational mode change can then be cyclically repeated to get several measurements from different locations. This position determination is preferably performed when the target not rapidly changes its position, i.e. changes its position slower than the change of the operational mode of the sensor elements, since then measurements from several locations at different time instances still are able to be used to determine the position of the target.

In one preferred embodiment of the invention the at least one sensor element generating the first magnetic field spatially surrounds the at least two sensor elements receiving the second magnetic field. This means the spatial extent of the at least two receiving sensor elements overlap fully with the spatial extent of the at least one transmitting sensor element.

In one preferred embodiment of the invention at least one sensor element generating the first magnetic field is located at a centre of two receiving sensor elements. Thereby, at the centre means that at least one point in the spatial extent of the at least one generating sensor element is located on a connecting line between one point in the spatial extent of one of the at least two receiving sensor elements and a point within the spatial extent of the other of the receiving sensor elements. For example, the respective points may be the centre points of the respective spatial extents. Further or additionally the at least two sensor elements of the at least three sensor elements may be arranged symmetrically with respect to the at least one sensor element of the at least three sensor elements generating the first magnetic field.

In one preferred embodiment of the invention the at least one transmitting sensor element is configured to generate an alternating first magnetic field. While each magnetic field is characterized by a north pole and a south pole, an alternating magnetic field is characterized by a change in the position of the north pole and the south pole. For example, the north and the south pole may fluctuate such that after a certain time, the north pole becomes the south pole while the south pole becomes the north pole. This fluctuation may be periodic and may be characterized by a periodic duration. This periodic duration may be the cycle time of the alternating first magnetic field. Technically, the alternating first magnetic field may be caused by driving the at least one transmitting sensor element with an alternating current or voltage. The generated first magnetic field may be a symmetric magnetic field, i.e. may be a rotationally invariant magnetic field. If the first magnetic field is produced by several transmitting sensor elements, these transmitting sensor elements can produce synchronized alternating magnetic fields or non-synchronized alternating magnetic fields. For example, one transmitting sensor element may produce in one time instance, i.e. a fixed point in time with no duration, a magnetic field, which north pole is facing the target, whereas in the same time instance a second transmitting sensor element is producing a magnetic field, which north pole is also facing the target, whereas in a second time instance both transmitting sensor elements produce each a magnetic field which south pole is facing the target. In this respect it can also be said that the at least two transmitting sensor elements produce synchronized alternating magnetic fields. However, they can also produce both non-synchronized alternating magnetic fields. For example, one transmitting sensor element may produce in one time instance a magnetic field, which north pole is facing the target, whereas in the same time instance a second transmitting sensor element is producing a magnetic field, which south pole is facing the target, and vice versa in a second time instance.

In one preferred embodiment of the invention the at least one transmitting sensor element is inductively coupled to at least two receiving sensor elements via the target. The target affects the emanated first magnetic field, i.e. the target deforms the emanated first magnetic field. This deformation is caused by induced eddy currents within the target, wherein these eddy currents are induced by the first magnetic field emanated by the at least one transmitting sensor element. These eddy currents themselves produce a magnetic field, which leads to the deformation of the emanated first magnetic field. The deformed emanated first magnetic field is then measured by the at least two receiving sensor elements. It can also be said that the effect of the target on the emanated first magnetic field is measured, such that by this measurement the position of the target can be determined. The eddy currents induced within the target and their associated magnetic field are dependent upon the shape or form of the target and how the eddy currents can flow within the target. As such, the deformation of the emanated first magnetic field caused by the target is dependent on its shape or form. It is thereby clear to a person skilled in the art that the first magnetic field generated by at least one transmitting sensor element comprises a gradient in the magnetic flux, which causes the eddy currents to flow within the target. If more than one transmitting sensor element is used, the first magnetic field is constituted by the superposition of the at least two magnetic fields produced. In order to encounter also in this case a gradient in the first magnetic field, either the magnetic fluxes of the generated magnetic fields can be different and/or the direction of the generated magnetic fields can be different.

In general, it can be said that the magnetic flux of the impinging magnetic field at the target generates eddy currents that will flow along discrete paths defined by structures of the target. Thereby, some of these eddy currents may cancel out each other, whereas others will be strengthened dependent on the difference in geometry of the structures and/or the difference in magnetic fluxes impinging on the target.

For example, if the target has structures with the same inductance, the impinging magnetic field needs to exhibit a gradient, in order that the partially and/or purely induced eddy currents are not cancelled out, whereas if the target has got structures with difference in inductance between adjacent structures, the magnetic field does not need to exhibit a magnetic gradient. As such, with the geometry of the structures and therefore the shape or form of the target, it can be accounted for different impinging magnetic field situations.

This can be exploited, for example, to increase the eddy currents along the preferred direction of the target. Hence, the magnetic field produced by the eddy currents in turn can be increased and as such also the signal induced in the coils.

The target's shape or form deforms the emanated magnetic field in a preferred direction by defining conductive paths, along which the eddy currents can flow, which themselves produce a magnetic field, which affects the first magnetic field. Because the target is non-rotationally invariant, this preferred direction is only encountered at discrete positions of the target, such that the target's position can be determined based on the measurement of the deformation of the emanated first magnetic field. Thereby, the deformed emanated first magnetic field is the second magnetic field and causes a current or voltage at the at least two receiving sensor elements. The magnitude of the caused current or voltage caused at the at least two receiving sensor elements is dependent on how the target and as such the preferred direction of the deformation of the emanated first magnetic field is orientated relatively to the at least two receiving sensor elements, such that the current or voltage values give an indication of the orientation and as such the position of the target.

In one preferred embodiment of the invention the sensor elements are coils. When a current is passed through these coils a magnetic field is generated. The strength of the magnetic field and as such the amount of magnetic flux produced is proportional to the amount of current provided to the coil. If the coils are exposed to a magnetic field, for example the second magnetic field, a current is induced in the coils. As such dependent on whether a current is passed through the coils or is induced in the coils, the sensor elements are termed transmitting sensor element or receiving sensor element. Thereby, the spatial extent of the coils can be the same or different. For example, the spatial extent of the transmitting sensor element, i.e. the transmitting coil, can be larger than the spatial extent of the receiving sensor elements, i.e. the receiving coils. Thereby, a larger transmitter coil produces a stronger first magnetic field than a smaller transmitter coil, as such the second magnetic field is stronger.

In one preferred embodiment of the invention the sensor elements are implemented together with means for driving the at least one transmitting sensor element and/or with means for processing signals outputted by the receiving sensor elements. The means for driving the at least one transmitting sensor element may be configured to provide the at least one transmitting sensor element with an alternating current. The means for processing may combine the signals, i.e. the current or voltage values, outputted by the at least two receiving sensor elements. The processing means may form a difference and/or a sum of the values outputted by the at least two receiving sensor elements. The processing means may, in addition to forming the difference and/or the sum, also perform other mathematical combinations with the outputted values. Thereby, the calculations may be used for correcting target offsets. For example, the surface of the target facing the sensor may define one plane and at least one of the receiving sensor elements may define a second plane. If these two planes are not parallel to one another, respectively are inclined to one another, the gap between the target and the sensor is also inclined. Hence, the receiving elements have not all the same distance from the target, which in turn means the induced property at the receiving elements located closer to the target will be higher than the induced property at the receiving elements located farther away from the target. By averaging the values outputted by the at least two receiving elements this effect can be accounted for. Hence, the processing means may not only form the difference and summation, but may also perform compensations. Further, the processing means may also perform other mathematical operations, like forming ratios etc. Furthermore, the means for processing may perform a comparison of the signal and stored values. The stored values thereby may give an indication of values to be expected by the receiving elements for particular positions of the target. The stored values may thereby be stored during an initial calibration run or may be modelled results. The sensor may therefore also comprise storage means. The means for storing may thereby store the values in a lookup table. The respective values may also be referred to as reference values. The means for driving the at least one transmitting sensor element and/or the means for processing and/or the means for storing may be implemented in one die or a moulded package for a semiconductor chip.

In one preferred embodiment of the invention at least two of the receiving sensor elements forming the sensor element pair are hardwired to form a signal.

In one preferred embodiment of the invention the shape or form of the target, which acts together with the sensor according to the invention, can be constituted by a structure, which directs the eddy currents induced in the target by the first magnetic field to flow in a particular direction, such that the effect of the target on the emanated first magnetic field is also directional, i.e. in one preferred direction. It can also be said that the specific structure of the target provides a moduled conductivity in one direction and an essentially constant conductivity distribution in a second direction. Hence, the impinging first magnetic field is attenuated more in the first direction than in the second direction. Thereby, the particular structure may be formed by at least one recess and/or at least one slit in the target. A slit in the target may extend from one side of the target to the opposite side. For example, the slit may be a hole in the target, wherein said hole has a depth of the entire thickness of the target. In other words, a slot may be configured in such a way that it penetrates the whole thickness of the body of the target. Thereby, the slit may have any shape or form that is suitable to direct the flow of the eddy currents within the target, namely around the slit. A recess however, may extend from one side of the target to a point somewhere inside of the body of the target and does not extend to the opposite side of the target, i.e. a recess may be a hole in the target, wherein said hole has a depth smaller than the entire thickness of the target. Also a recess is used to direct the flow of the eddy currents and as such allows the target to produce a directional magnetic field in order to affect the emanated first magnetic field in a preferred direction, this affected first magnetic field then constitutes the second magnetic field.

In one preferred embodiment of the invention the target, which acts together with the sensor according to the invention, has a planar shape. Thereby, the surface of the target facing the sensor may span a plane which is substantially parallel to a plane in which at least one of the sensor elements is arranged.

In one preferred embodiment of the invention the target, which acts together with the sensor according to the invention, is made of a conductive material. The conductive material may be a metal, in particular, a ferromagnetic metal. However, the person skilled in the art will also contemplate that other materials as metal may be used, which possess conductive properties.

The above-mentioned object is also solved by a method for sensing a position of a target. Thereby, the method comprises the steps of generating a first magnetic field by at least one sensor element of at least three sensor elements, receiving a second magnetic field by at least two sensor elements wherein the second sensor element is associated with the first magnetic field, and calculating a signal from outputted signals of the at least two receiving sensor elements, wherein the signal is indicative of the position of the target. Thereby, the calculated signal can be the difference and/or the sum of the outputted signals of the at least two receiving sensor elements.

In one preferred embodiment of the invention the method further comprises calculating at first a differential signal from the outputted signals of the at least two receiving sensor elements to determine a 180° ambiguity of the target and then calculating the sum from the outputted signals of the at least two receiving sensor elements to determine the position of the target, wherein the sum signal has a better signal to noise ratio than the differential signal.

In one preferred embodiment of the invention the method further comprises comparing the value of the signal or signals to stored values, which are either modelled or taken during a calibration run. The stored values thereby give an indication of the signal value or values to be expected for a particular position of the target.

The above-mentioned object is also solved by a system for sensing a position of a target, in particular for offset invariant sensing of the position of the target. Thereby, the system comprises sensor elements, which may be referred to as a sensor, and a target. Thereby, at least one sensor element generates a first magnetic field, wherein one or more sensor elements receive a second magnetic field which is associated with the first magnetic field. Preferably at least two receiving sensor elements form at least one sensor element pair and provide a signal indicative of the position of the target.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
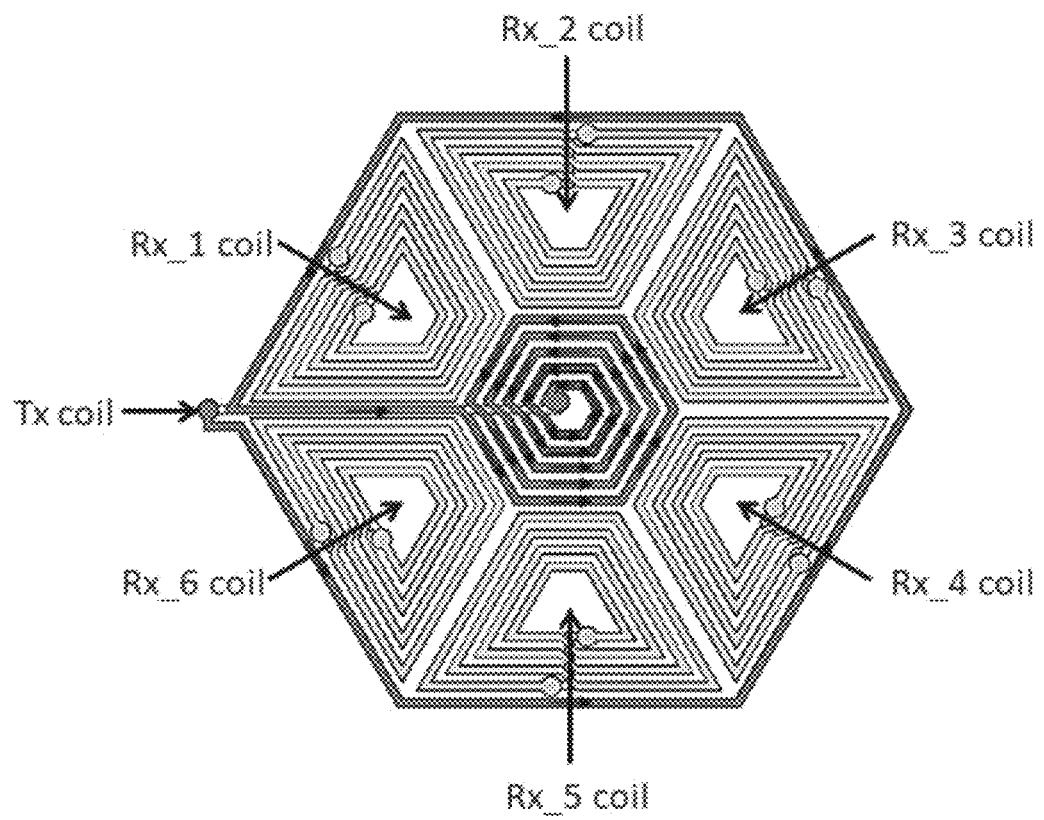
FIG. 1 illustrates an embodiment of an inductive position sensor according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

A sensor chip according to an embodiment of the invention can be referred to as a sensor, a position sensor, an inductive sensor or an inductive position sensor. The sensor chip comprises an arrangement of sensor elements. The invention relates more in particular to an inductive position sensor composed of a coil set, comprising at least one transmitting (Tx) coil and at least one receiving (Rx) coil and to a system comprising the inductive position sensor and a target device. The proposed solution offers the advantage of having a reduced common mode, i.e. a reduced direct coupling between transmitting (Tx) coil and receiving (Rx) coil. The direct coupling between Tx and Rx coil is suppressed by a specific Tx coil design and an arrangement of the Rx coils as described below.

In the normal operation of the sensor, the Tx coil is excited by an alternating voltage and an induced voltage is read at the Rx coils terminal due to the coupling between the Tx and Rx coils, which is modulated by the target device. Ideally, one wishes to have, in absence of the target, no signal at the Rx coils, i.e. no direct coupling between Tx and Rx coils, or, in other terms, zero common mode. In the present invention the common mode is at least reduced or eliminated by means of a specific coil design that allows placing all the coils in a single plane. An embodiment of an inductive position sensor according to this invention is shown in FIG. 1.

Each sensor element possesses contacts via which signals or information in general may be propagated from the sensor elements to an optional determination unit. Furthermore, the contacts may be used to provide the sensor elements with an alternating current to generate a magnetic field or to drive the sensor elements in general. The determination unit can be part of the sensor chip in certain embodiments, but may be external to the actual sensor chip in other embodiments or can be absent all together.

The sensor chip may also comprise further contacts, with which the sensor chip can be connected to circuit boards and with which signals can be inputted and outputted from and to the sensor chip. Thereby, the contacts can either be connected to the determination unit, or if the determination unit is absent, these further contacts can be connected to the above-mentioned contacts for information propagation.

In the present invention the sensor elements are inductive elements. An inductive element may, for example, be a coil, a wire, a wire in the shape of a coil, a wire in the shape of a spiral, or a wire in the shape of a helix, a loop, a multi turn loop, a solenoid, an inductor, or an array. In FIG. 1 the sensor elements are denoted "TX" and "RX". Thereby, "TX" indicates that the respective sensor element is generating a magnetic field, as such the sensor element denoted "TX" can also be named transmitting sensor element. The sensor elements denoted "RX" receive the magnetic field, as such the sensor elements denoted "RX" can also be named receiving sensor elements. The different sensor elements may change their sensitivity and/or the strength of the magnetic field they produce.

The sensor elements in FIG. 1 are electrically conductive coils. This means if a current passes through the transmitting sensor element the first magnetic field is generated. The thus generated first magnetic field couples via the target to the RX coils, into which a current is induced due to the coupling, respectively due to the magnetic flux associated with the magnetic field. These induced currents can be outputted by the coils as their measured signal and can form a signal. This signal gives an indication of how the target has affected the magnetic field generated by the transmitting coil and in turn how the preferred direction of the target is orientated in comparison to the RX sensor elements. Since the position of the coils with respect to each other is known as well as the utilized target, the position of the target can directly be calculated from the induced properties. However, it is also possible that during a calibration run the respective induced properties have been correlated with the position of the target, then this information can be used to determine the position of the target from the signal. Thereby, the respective induced properties for the calibration run may be stored in a lookup table and may be compared to the measured current values, respectively the signal, to determine the position of the target. It is however also possible that instead of, or additionally to, a calibration run modelled results are stored, which can be compared to the measured induced properties, respectively the signal. The induced properties may be the induced currents induced voltages in the receiving coils.

Turning back to the embodiment of FIG. 1, six conductive coils are used as receiving RX coils, whereas the embodiment example encompasses one transmitting coil. At least one transmitting coil winding is arranged to surround the receiving coils. Hence, the spatial extent of the receiving sensor elements fully overlaps with the spatial extent of the transmitting coil. It is clear to a person skilled in the art that the overlap can also be less than the overlap shown in FIG. 1. In the shown embodiment example, the transmitting coil is depicted as a single wire loop surrounding the six receiving coils. More in particular, the Tx coil comprises at least one outer turn that surrounds the Rx coils, plus an additional central winding of at least one turn. The Rx coils are placed in the space between the outer and inner windings of the Tx coil. The Rx coils form a circle around the inner TX winding and are arranged in the circle with equal angles between the coils. The inner winding does not spatially overlap with the receiving coils. Although the sensor elements in FIG. 1 are shown to be in one plane, the sensor elements may also be arranged in a set of different planes which may be distant to one another. Preferably at least two RX coils have the same inductance. Note also that in FIG. 1 the Rx coils cover over 50% of the area between the two Tx windings.

The outer and inner Tx coils windings are built to be both turning in the same sense, i.e. either both clockwise or both counterclockwise. In this way, the two Tx coil portions generate fields of opposite magnitude in the region comprised between them, i.e. where the Rx coils are placed. In certain embodiments the inner Tx coil winding and the outer Tx coil winding have a same central point. As an example, the coil layout of FIG. 1 is taken and a counterclockwise current flowing in it is considered. The outer winding of the Tx coil generates in the region where the Rx coils are placed, a field pointing out of the plane. On the opposite, the inner winding generates a field pointing in the direction entering in the plane. For appropriately chosen inner winding diameter and number of turns, the net magnetic flux density crossing the Rx coils can be brought to very low values or to zero.

Hence, using the transmitting coil designed as proposed allows for suppressing the common mode signal. For example, by having more turns and/or more current flowing in the inner transmitting winding as compared to the outer transmitting winding a suppression of the common mode signal may be achieved. Hence, with such kind of arrangement, all the coils may be arranged within the same plane, for example the same layer of a substrate of a semiconductor chip.

The shape of the receiving and transmitting coils is not limited to the shapes as depicted in FIG. 1. The coils may, for example, also be hexagonal or shaped like a sector of a circle. It is however clear to a person skilled in the art that the depicted shapes are not limiting.

In the embodiment of FIG. 1 the Tx coil is built using a single wire. In this embodiment connection is needed between the outer and inner Tx coil windings. However, other embodiments are possible where the outer and inner windings are not connected directly, but rather constitute two separate coils which are driven separately, even though such an implementation would require a somewhat more complex Tx coil driving system.

Also other arrangements of the sensor elements and in particular the number of the sensor elements are conceivable. Although explicit coil arrangements and coil shapes have been referred to, it is clear to the person skilled in the art that further arrangements and shapes are also possible. The sensor elements may each have a maximum size of 5 mm, 8 mm, 10 mm, 15 mm, 20 mm or 30 mm. The maximum size may be a diameter of a sensor element, an envelope of a sensor element or a length of the longest side of a sensor element or the maximum extent of all sensor elements together in one dimension.

Figure 2:
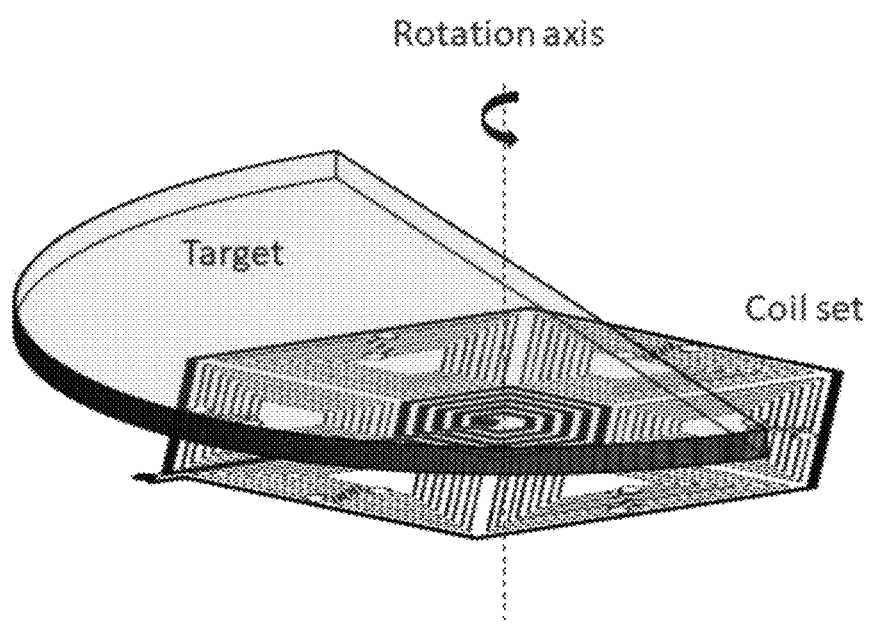
FIG. 2 illustrates a system comprising the inductive position sensor of FIG. 1 and a target device.

FIG. 2 illustrates an embodiment of a system according to the present invention comprising an inductive position sensor with a set of coils comprising a transmit coil composed of an outer winding and an inner winding, both turning in the same sense and leaving a space between them and at least one receive coil placed in the space between the two transmit coil windings and further comprising a moving conducting object, the target device, of arbitrary shape, the position of which modulates the coupling between Tx and Rx coil.

The target device is configured to affect the magnetic flux coupling between the transmitting coil and the receiving coils. Thereby, the first magnetic field emanated from the transmitting coil causes eddy currents to flow within the target device. The shape or form of the target device is thereby chosen such that the eddy currents flow in a predefined direction within the target. This causes the eddy currents to produce at least one directional magnetic field, which affects the first magnetic field emanated by the transmitting coil. In detail, it deforms the course of the magnetic field lines of the emanated first magnetic field. Hence, also the magnetic flux is affected. This results in a second magnetic field, which is a superposition of the first magnetic field and the magnetic field produced by the target. It can also be said the transmitting coil inductively couples to the receiving coils via the target. In this case the magnetic field lines extend from the transmitting coil to the respective receiving coil, wherein they pass through the target device.

The receiving coils receive the affected first magnetic field and the second magnetic field, respectively, and encounter the affected magnetic flux, such that a current or voltage can be outputted by the two receiving coils. Hence, the at least two receiving coils react to the transmitting coil, in such a way that the at least two receiving coils are coupled to the at least one transmitting coil via the target device.

If the target device changes its position, the shape or form of the target device changes relatively to the magnetic field lines of the magnetic field generated by the transmitting coil, i.e. the magnetic field lines are differently affected, which in turn means the receiving coils will encounter a different magnetic flux for different positions of the target device.

For example, the shape or form of the target device may align the magnetic field lines along a particular direction, which is derivable from the shape or form of the target. If the transmitting coil and at least one of the receiving coils oppose each other along this particular direction, the magnetic flux coupling between the transmitting coil and the at least one of the receiving coils is the highest. This in turn means the respective receiving coil will measure a high induced current or voltage. The other receiving coil, which does not oppose the transmitting coil in the particular direction of the target device, will encounter a lower magnetic flux. This in turn means the respective receiving coils will measure a lower induced current or voltage. Since the induced currents or voltages measured by the receiving coils are proportional to the amount of magnetic flux coupling, which is affected by the shape or form of the target device, the respective currents or voltages allow a determination of the target position. In other words, due to the shape or form of the target device, which is non-rotationally invariant, different preferred directions are encountered at different positions of the target. Hence, at different positions of the target, different magnetic flux couplings between the transmitting coil and the receiving coils are encountered. This in turn means different induced currents or voltages are encountered, from which the position of the target device can be determined. Thereby, the preferred direction in which the target aligns the magnetic field lines is dependent on its shape or form. It can also be said that it is dependent on structures constituting the shape or form of the target. However, since the preferred direction of the shape or form of the target is due to its invariance only predominant in one direction, an offset of the target does not significantly change the relative currents or voltages measured by the receiving coils, since their position with respect to each other is fixed and the preferred direction of the target is not changed. This means the offset of the target has the same relative effect on the magnetic flux coupling and as such on the outputted currents or voltages.

The target device may have different shapes or forms. The shape or form of the target device is non-rotationally invariant in the sense that a rotation about an axis in an arbitrary angle changes the shape or form of the target device as it is seen from the location of one of the at least three sensor elements. However, it is clear to the person skilled in the art that there may be particular angles for which a rotation about this angle may result in the same shape or form of the target.

Figure 3:
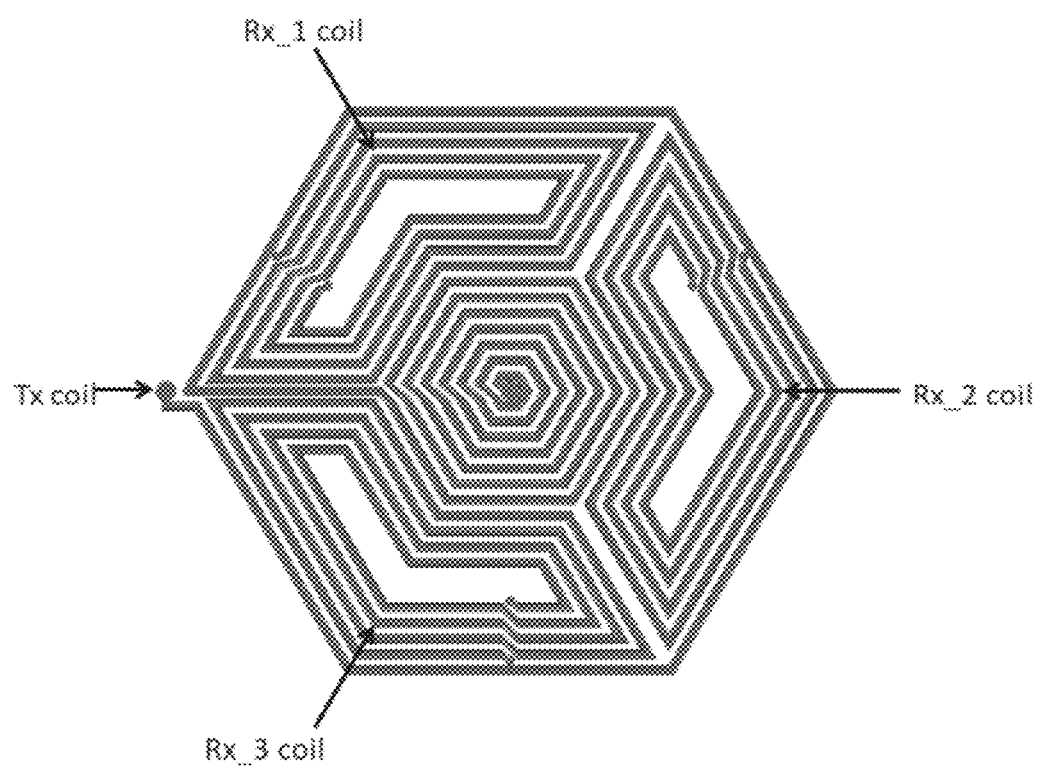
FIG. 3 illustrates another embodiment of an inductive position sensor according to the invention.

FIG. 3 illustrates an embodiment of the inductive position sensor of the invention, wherein three receiving coils are used and one transmit TX coil comprising two windings.

Figure 4:
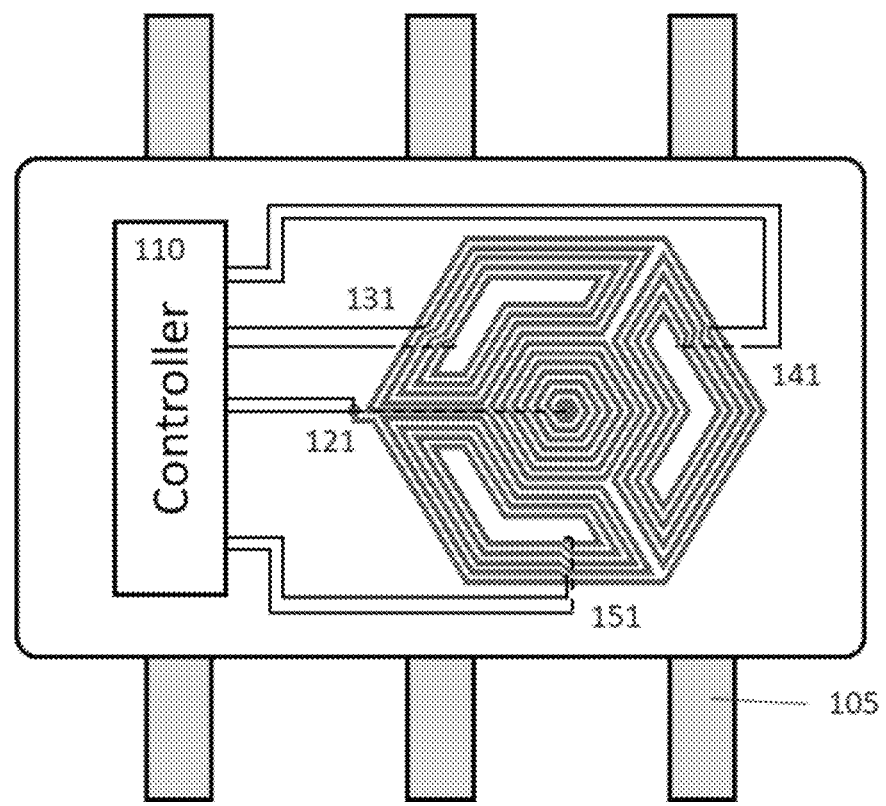
FIG. 4 illustrates an embodiment of an inductive position sensor according to the invention.

FIG. 4 shows an embodiment of a sensor chip comprising the inductive position sensor of FIG. 3. The various sensor elements (i.e. the RX coils and the TX coil comprising an inner and an outer transmitting coil winding) each have contacts 121, 131, 141, 151. Via these contacts 121, 131, 141, 151 signals or information in general may be propagated from the sensor elements to an optional determination unit 110. Furthermore, the contacts 121, 131, 141, 151 may be used to provide the sensor elements with an alternating current to generate a magnetic field or to drive the sensor elements in general. The sensor chip of FIG. 4 also shows contacts 105, with which the sensor chip can be connected to circuit boards and with which signals can be inputted and outputted from and to the sensor chip. Thereby, the contacts 105 can either be connected to the determination unit 110, or if the determination unit 110 is absent, the circuit board contacts 105 can be connected to the contacts 121, 131, 141, 151 of the sensor elements.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An inductive position sensor configured to determine a position of a target device, comprising at least one receiving coil arranged to receive a magnetic field and a plurality of transmitting coil windings comprising at least an inner transmitting coil winding and an outer transmitting coil winding arranged to generate said magnetic field, whereby said at least one receiving coil is positioned between said inner transmitting coil winding and said outer transmitting coil winding and whereby said transmitting coil windings are so arranged that current flows in the same sense in each transmitting coil winding, yielding a zero net magnetic flux in said at least one receiving coil in absence of a target device.

2. The inductive position sensor as in claim 1, wherein said plurality of transmitting coil windings form a single coil.

3. The inductive position sensor as in claim 1, wherein said plurality of transmitting coil windings are arranged to generate an alternating magnetic flux inducing a signal at said at least one receiving coil, wherein in absence of external disturbances said signal is substantially zero.

4. The inductive position sensor as in claim 1, wherein said inner transmitting coil winding and said outer transmitting coil winding have a same central point.

5. The inductive position sensor as in claim 1, comprising an even number of receiving coils.

6. The inductive position sensor as in claim 1, wherein said at least one receiving coil and said plurality of transmitting coil windings are in a same plane or in a same set of planes.

7. The inductive position sensor as in claim 1, comprising at least two receiving coils.

8. The inductive position sensor as in claim 7, wherein said at least two receiving coils are arranged to form a circle around said inner transmitting coil winding.

9. The inductive position sensor as in claim 8, wherein said at least two receiving coils are arranged equi-angularly in said circle.

10. The inductive position sensor as in claim 7, wherein said at least two of said at least two receiving coils have a same inductance.

11. The inductive position sensor as in claim 7, wherein said at least two receiving coils cover at least 50% of the area between said inner transmitting coil winding and said outer transmitting coil winding.

12. The inductive position sensor as in claim 1, wherein said at least one receiving coil does not overlap with said inner transmitting coil winding and wherein said outer transmitting coil winding fully overlaps with said at least one receiving coil.

13. A system comprising an inductive position sensor as in claim 1 and a target device arranged to rotate around a centre of geometry of said inductive position sensor.

14. The system as in claim 13, further comprising a determination unit arranged to process signals received from said at least one receiving coil and/or said plurality of transmitting coil windings.

\* \* \* \* \*